(12) United States Patent
Kurehashi et al.

(10) Patent No.: US 11,710,408 B2
(45) Date of Patent: Jul. 25, 2023

(54) COMMUNICATION APPARATUS, VEHICLE, COMPUTER-READABLE STORAGE MEDIUM, AND COMMUNICATION METHOD

(71) Applicant: HONDA MOTOR CO., LTD., Tokyo (JP)

(72) Inventors: Takahiro Kurehashi, Saitama (JP); Shigeru Inoue, Saitama (JP); Hiroshi Furumi, Saitama (JP); Yasuhiro Miyachi, Saitama (JP); Yasuaki Gunji, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 17/183,368

(22) Filed: Feb. 24, 2021

(65) Prior Publication Data
US 2021/0280066 A1 Sep. 9, 2021

(30) Foreign Application Priority Data
Mar. 3, 2020 (JP) .................................. 2020-036294

(51) Int. Cl.
*G08G 1/16* (2006.01)
*H04W 4/40* (2018.01)

(52) U.S. Cl.
CPC .............. *G08G 1/166* (2013.01); *H04W 4/40* (2018.02)

(58) Field of Classification Search
CPC ........ G08G 1/166; G08G 1/005; G08G 1/164; H04W 4/40; H04W 4/029; H04W 4/023;
(Continued)

(56) References Cited

U.S. PATENT DOCUMENTS

2019/0031141 A1* 1/2019 Lazarini .................. B60R 25/24
2019/0043360 A1* 2/2019 Weinfield .............. H04W 24/06
(Continued)

FOREIGN PATENT DOCUMENTS

CN      110155048 A      8/2019
JP      2004046426 A      2/2004
(Continued)

OTHER PUBLICATIONS

Office Action issued for counterpart Chinese Application 202110074152. 6, issued by the China National Intellectual Property Administration dated Jul. 5, 2022.

*Primary Examiner* — Abdullahi Ahmed

(57) ABSTRACT

Provided is a communication apparatus including: a target specification unit for specifying a position of a target at risk of approaching a moving body; and a communication unit for transmitting, based on the target position specified by the target specification unit, warning information including positional information of an external terminal to output a warning; a program causing a computer to function as: a target specification unit for specifying a position of a target at risk of approaching a moving body; and a communication unit for transmitting, based on the target position specified by the target specification unit, warning information including positional information of an external terminal to output a warning; and a communication method including: specifying a position of a target at risk of approaching a moving body; and transmitting, based on the specified target position, warning information including positional information of an external terminal to output a warning.

23 Claims, 8 Drawing Sheets

(58) Field of Classification Search
CPC ...... H04W 4/027; B60W 30/08; B60W 40/02; B60W 40/105; B60W 50/00; G07C 5/0866
See application file for complete search history.

(56) References Cited

U.S. PATENT DOCUMENTS

| | | | |
|---|---|---|---|
| 2019/0124015 A1* | 4/2019 | Loehr | H04L 69/321 |
| 2019/0182639 A1* | 6/2019 | Basu Mallick | H04W 8/24 |
| 2019/0227555 A1* | 7/2019 | Sun | G08G 1/005 |
| 2019/0248381 A1 | 8/2019 | Yu | |
| 2020/0178048 A1* | 6/2020 | Kim | H04W 12/062 |
| 2021/0065551 A1* | 3/2021 | Manohar | H04W 4/40 |
| 2021/0084542 A1* | 3/2021 | Ahmad | H04W 4/06 |
| 2021/0120384 A1* | 4/2021 | Haran | H04L 1/1896 |

FOREIGN PATENT DOCUMENTS

| | | | |
|---|---|---|---|
| JP | 2006163637 A | 6/2006 | |
| JP | 2017027525 A | 2/2017 | |
| JP | 2019194909 A | 11/2019 | |

* cited by examiner

| CATEGORY | VELOCITY V[km/s] | TRANSMISSION METHOD |
|---|---|---|
| PEDESTRIAN | $0 < V \leq 2$ | METHOD 1 |
| PEDESTRIAN | $2 < V \leq 5$ | METHOD 2 |
| ⋮ | ⋮ | ⋮ |
| AUTOMOBILE | $0 < V \leq 5$ | METHOD 1 |
| AUTOMOBILE | $5 < V \leq 30$ | METHOD 2 |
| ⋮ | ⋮ | ⋮ |

*FIG. 6*

COMMUNICATION APPARATUS, VEHICLE, COMPUTER-READABLE STORAGE MEDIUM, AND COMMUNICATION METHOD

CROSS REFERENCE TO RELATED APPLICATION

The contents of the following Japanese patent application are incorporated herein by reference, Japanese Patent Application NO. 2020-036294 filed on Mar. 3, 2020.

BACKGROUND

1. Technical Field

The present invention relates to a communication apparatus, a vehicle, a computer-readable storage medium, and a communication method.

2. Related Art

Patent Document 1 describes "a vehicle communication terminal for transmitting a search signal and receiving a response signal". Patent Document 2 describes that " . . . a road, . . . and a traverser are detected from an image captured by an in-vehicle camera". Patent Document 3 describes "an image recognition means to recognize a pedestrian from an image around a vehicle".

PRIOR ART DOCUMENT

Patent Document

Patent document 1: Japanese Patent Application Publication No. 2017-27525
Patent document 2: Japanese Patent Application Publication No. 2019-194909
Patent document 3: Japanese Patent Application Publication No. 2006-163637

BRIEF DESCRIPTION OF THE DRAWINGS

FIG. 6 shows a data structure of transmission method information referred to by a communication control unit 270 to specify a transmission method.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
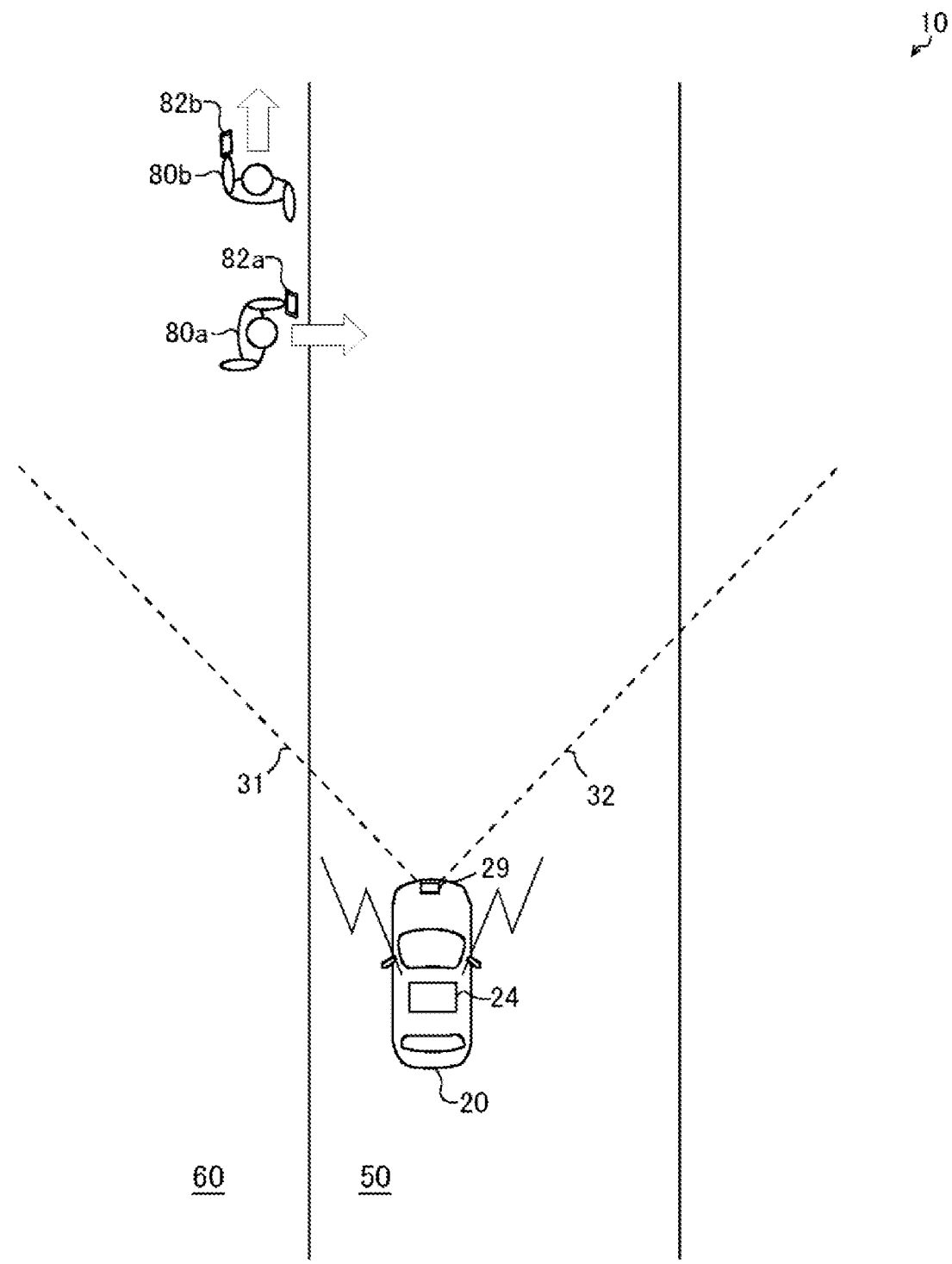
FIG. 1 schematically shows a usage scene of a warning system 10.

FIG. 1 schematically shows a usage scene of a warning system 10. The warning system 10 includes a vehicle 20, a terminal 82a, and a terminal 82b. The terminal 82a is a terminal carried by a pedestrian 80a, and the terminal 82b is a terminal carried by a pedestrian 80b. The pedestrian 80a and the pedestrian 80b may be collectively referred to as "pedestrians 80". Moreover, the terminal 82a and the terminal 82b may be collectively referred to as "terminals 82". The vehicle 20 is an example of "a moving body".

In the warning system 10, the vehicle 20 transmits warning information to the terminals 82 when there exists pedestrians 80 at risk of approaching the vehicle 20. When receiving the warning information, the terminals 82 give a warning to the pedestrians 80 by warning display, sound, vibration, or the like. In this way, the pedestrians 80 are notified of approach of the vehicle 20.

Note that the terminals 82 are an example of an "external terminal". The terminals 82 may be a personal digital assistant such as a mobile phone or a smart phone. The terminals 82 include a positioning function. The terminals 82 receive a radio wave transmitted from, for example, a GNSS (Global Navigation Satellite System) satellite, and measure current positions of the terminals 82 based on the radio wave transmitted from the GNSS (Global Navigation Satellite System) satellite. The terminals 82 periodically update the current positions of the terminals 82 by periodically performing positioning.

This embodiment will mainly describe a case where a "target" at risk of approaching the vehicle 20 is a "pedestrian". However, the "target" at risk of approaching the vehicle 20 may be another moving body or vehicle. In this case, the "external terminal" may be a communication apparatus such as a telematics control unit (TCU) provided in another vehicle.

The vehicle 20 includes a sensor 29 and a communication apparatus 24. The sensor 29 includes a camera and a radar. The sensor 29 acquires information in a range from a left borderline 31 to a right borderline 32. For example, the sensor 29 acquires an image and distance measurement information in the range from the left borderline 31 to the right borderline 32. The communication apparatus 24 recognizes the image acquired by the camera to detect the pedestrians 80. Moreover, the communication apparatus 24 detects current positions of the pedestrians 80 based on distance measurement information acquired by the radar and a current position of the vehicle 20. The communication apparatus 24 specifies moving directions or the like of the pedestrians 80 based on orientations or the like of the pedestrians 80. The communication apparatus 24 specifies, based on the current positions and the moving directions of the pedestrians 80, pedestrians 80 who are at risk of approaching the vehicle 20, in particular, who can be on a planned traveling route of the vehicle 20.

For example, in the situation shown in FIG. 1, the vehicle 20 is traveling in a roadway 50. A footpath 60 is provided along with the roadway 50. The sensor 29 detects the pedestrian 80a and the pedestrian 80b walking in the footpath 60. Since the pedestrian 80b is facing a direction of walking in the footpath 60 in parallel with the roadway 50, the communication apparatus 24 determines that the pedestrian 80b is unlikely to approach the vehicle 20. On the other hand, since the pedestrian 80a is facing a direction of heading to the roadway 50, the communication apparatus 24 determines that the pedestrian 80a is at risk of approaching the vehicle 20.

In this case, the communication apparatus 24 transmits warning information which includes positional information for indicating a position of the pedestrian 80a detected by the sensor 29. When receiving the warning information, the terminal 82a gives a warning to the pedestrian 80a with a HMI (Human Machine Interface) function of the terminal 82a, if a distance between the position indicated by the positional information included in the warning information and a current position of the terminal 82a is shorter than a predetermined value. On the other hand, when receiving the warning information, the terminal 82b does not give a warning to the pedestrian 80b, determining that a distance between the position indicated by the positional information included in the warning information and a current position of the terminal 82b is longer than a predetermined value.

Thus, the communication apparatus 24 transmits, to the terminals 82, the warning information with positional information included therein of the pedestrian 80a predicted to approach the vehicle 20. Therefore, the terminal 82a can determine, based on the positional information included in the warning information and the current position of the terminal 82a, that it is necessary to give a warning to the pedestrian 80a, and promptly issue a warning to the pedestrian 80a. On the other hand, when receiving the warning information, the terminal 82b determines, based on the positional information included in the warning information and the current position of the terminal 82b, that it is not necessary to give a warning to the pedestrian 80b. Therefore, the terminal 82b does not need to perform further processing based on the warning information, and only has to discard the warning information received from the vehicle 20.

A technique to detect a body at risk of approaching the vehicle 20 includes a technique of detection using distance measurement information from a radar and a moving vector. However, this technique may misrecognize, for example, a body moving on a footbridge or an elevated road as a body approaching the vehicle 20. To avoid such misrecognition, it is necessary to perform three-dimensional recognition processing with reference to three-dimensional map information. Moreover, since multiple times of measurement are required to calculate the moving vector, it may take some time to detect the body at risk of approaching the vehicle 20. On the contrary, according to the warning system 10, since image recognition can be used to detect a type or an orientation of the body approaching the vehicle 20, the body approaching the vehicle 20 can be more appropriately detected than a case where the body approaching the vehicle 20 is detected based on the distance measurement information or the moving vector.

Note that a range in which the sensor 29 acquires information, that is, the range from the left borderline 31 to the right borderline 32 may be variable depending on a velocity of the vehicle 20 or an external situation of the vehicle 20. Making the range in which the sensor 29 acquires information variable depending on a vehicle velocity or an external situation of a vehicle, allows a body to be chosen that is more suitable for the situation.

Moreover, as mentioned above, according to the warning system 10, the communication apparatus 24 can cause the terminal 82a of the pedestrian 80a, who needs a warning, to give a warning, and can prevent the terminal 82a of the pedestrian 80b, who does not need a warning, from giving a warning, just by transmitting warning information including positional information. Thereby, it is possible to prevent a warning from being given to the pedestrians 80 who do not need a warning. Moreover, it is possible to suppress occurrence of unnecessary communication between the terminals 82 and the vehicle 20. Therefore, it is possible to suppress increase in communication traffic. In particular, the terminal 82b does not need to perform processing such as checking a position of the vehicle 20 approaching the pedestrian 80b or communicating with the vehicle 20.

Note that communication between the communication apparatus 24 and the terminals 82 is executed by direct communication. For example, the communication apparatus 24 directly communicates with the terminals 82 by short-range direct communication in Cellular-V2X. Short-range direct communication in Cellular-V2X includes a communication method such as LTE-V2X PC5 or 5G-V2X PC5 (abbreviated as "PC5" in this embodiment). As direct communication between the communication apparatus 24 and the terminals 82, a form using Wi-Fi (registered trademark) or DSRC (registered trademark) (Dedicated Short Range Communications) may be adopted. As direct communication between the communication apparatus 24 and the terminals 82, any direct communication method such as Bluetooth (registered trademark) in addition to Cellular-V2X or DSRC (registered trademark) may be adopted. The communication apparatus 24 may use a communication infrastructure provided in ITS (Intelligent Transport Systems) to directly communicate with the terminals 82.

Figure 2:
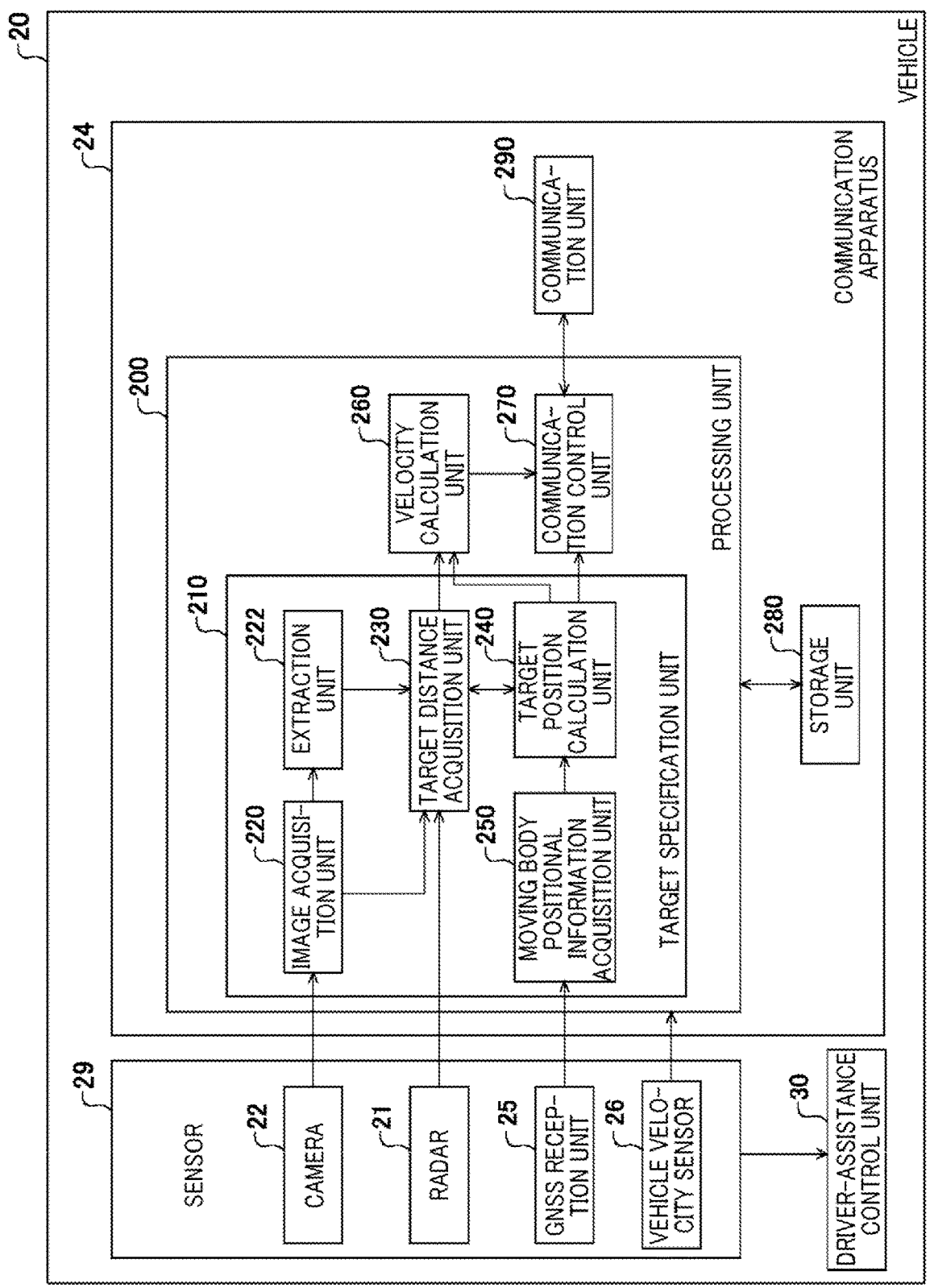
FIG. 2 shows a system configuration of a vehicle 20.

FIG. 2 shows a system configuration of the vehicle 20. The vehicle 20 includes a sensor 29, a communication apparatus 24, and a driver-assistance control apparatus 30.

The sensor 29 includes a radar 21, a camera 22, a GNSS reception unit 25, and a vehicle velocity sensor 26. The radar 21 may be LiDAR, a millimeter wave radar, or the like. The GNSS reception unit 25 receives a radio wave transmitted from a GNSS (Global Navigation Satellite System) satellite. The GNSS reception unit 25 generates information for indicating a current position of the vehicle 100 based on a signal received from the GNSS satellite. The camera 22 captures an image around the vehicle 20 to generate image information. For example, the camera 22 captures an image in a traveling direction of the vehicle 20 to generate image information. Note that the sensor 29 may include a position sensor such as an odometer or IMU (Inertial Measurement Unit) such as an acceleration sensor or an attitude sensor.

The communication apparatus 24 includes a processing unit 200, a storage unit 280, and a communication unit 290. The processing unit 200 is realized by, for example, an arithmetic processing apparatus including a processor. The storage unit 280 is realized with a non-volatile storage medium included therein. The processing unit 200 uses information stored in the storage unit 280 for processing. The communication unit 290 is responsible for direct communication with the terminals 82. The processing unit 200 may be realized by an ECU (Electronic Control Unit) including a microcomputer equipped with a CPU, ROM, RAM, I/O, a bus, and the like.

The processing unit 200 includes a target specification unit 210, a velocity calculation unit 260, and a communication control unit 270. The target specification unit 210 specifies a position of a target at risk of approaching the vehicle 20. In this embodiment, a "target at risk of approaching the vehicle 20" is, for example, a moving body, and may include at least one of a person and a vehicle. Moreover, "approaching" may include, for example, approaching the planned traveling route of the vehicle 20 or overlapping the planned traveling route. For example, the target specification unit 210 may specify a position of a pedestrian at risk of approaching the vehicle 20. The target specification unit 210 includes an image acquisition unit 220, an extraction unit 222, a target distance acquisition unit 230, a target position calculation unit 240, and a moving body positional information acquisition unit 250.

The moving body positional information acquisition unit 250 acquires positional information of the vehicle 20. Specifically, the moving body positional information acquisition unit 250 acquires the positional information of the vehicle 20 from the GNSS reception unit 25. The image acquisition unit 220 acquires an external image of the vehicle 20. Specifically, the image acquisition unit 220 acquires from the camera 22 an image captured by the camera 22. The extraction unit 222 extracts, from the image acquired by the image acquisition unit 220, the target at risk of approaching the vehicle 20. The target distance acquisition unit 230 acquires a distance to the target extracted by the extraction unit 222. The target distance acquisition unit 230 may acquire the distance to the target by the radar 21 installed in the vehicle 20. The target distance acquisition unit 230 may acquire the distance to the target based on the image acquired by the image acquisition unit 220. The target position calculation unit 240 calculates, based on the positional information of the vehicle 20 and the distance to the target, the position of the target at risk of approaching the vehicle 20.

The communication unit 290 transmits, based on the position of the target specified by the target specification unit 210, warning information including positional information of the terminals 82 to output a warning. The communication unit 290 causes, by transmitting the warning information, the terminals 82 which have received the warning information to output a warning, when the terminals 82 are located within a range determined from the positional information included in the warning information. Note that the communication unit 290 may transmit the warning information to the terminals 82 by direct communication. The communication unit 290 may transmit the warning information by broadcasting. Note that the communication unit 290 may transmit the warning information by directional communication. For example, the communication unit 290 may include a directional antenna, and transmit the warning information toward the position of the target specified by the target specification unit 210.

The velocity calculation unit 260 calculates information on a moving velocity of the target extracted by the extraction unit 222. For example, the velocity calculation unit 260 may calculate, based on a temporal change of the position calculated by the target position calculation unit 240, the moving velocity of the target extracted by the extraction unit 222. The velocity calculation unit 260 may calculate a relative velocity between the moving velocity of the target extracted by the extraction unit 222 and a moving velocity of the vehicle 20 detected by the vehicle velocity sensor 26. The velocity calculation unit 260 may calculate, based on a temporal change of the distance acquired by the target distance acquisition unit 230, the relative velocity between the moving velocity of the target extracted by the extraction unit 222 and the moving velocity of the vehicle 20 detected by the vehicle velocity sensor 26. The velocity calculation unit 260 may calculate the relative velocity based on the temporal change of the distance acquired by the target distance acquisition unit 230.

The communication control unit 270 selects a transmission method for the communication unit 290 to transmit the warning information. The communication control unit may select the transmission method based on at least any of the moving velocity of the target, the moving velocity of the vehicle 20, and the relative velocity between the vehicle 20 and the target. The communication control unit 270 may select the transmission method based on a category of the target.

The transmission method may include a first transmission method in which the warning information is transmitted with a first signal intensity, and a second transmission method in which the warning information is transmitted with a second signal intensity different from the first signal intensity. The selection of the transmission method may include selecting one of the first transmission method and the second transmission method. Moreover, the transmission method may include the first transmission method in which the warning information is transmitted by unicasting to the terminals 82 associated with the target, and the second transmission method in which the warning information is transmitted by broadcasting. The selection of the transmission method may include selecting one of the first transmission method and the second transmission method.

The driver-assistance control apparatus 30 uses the information detected by the sensor 29 to assist driving of the vehicle 20. The driver-assistance control apparatus 30 may be realized by an ECU having a function of ADAS (Advanced Driver-Assistance Systems).

Figure 3:
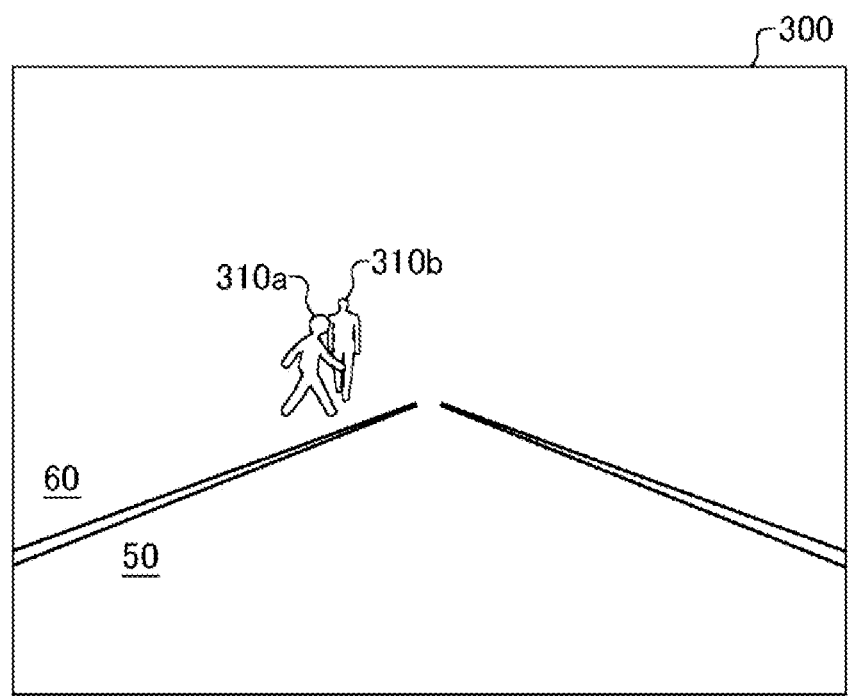
FIG. 3 schematically shows an image 300 captured by a camera 22.
Figure 4:
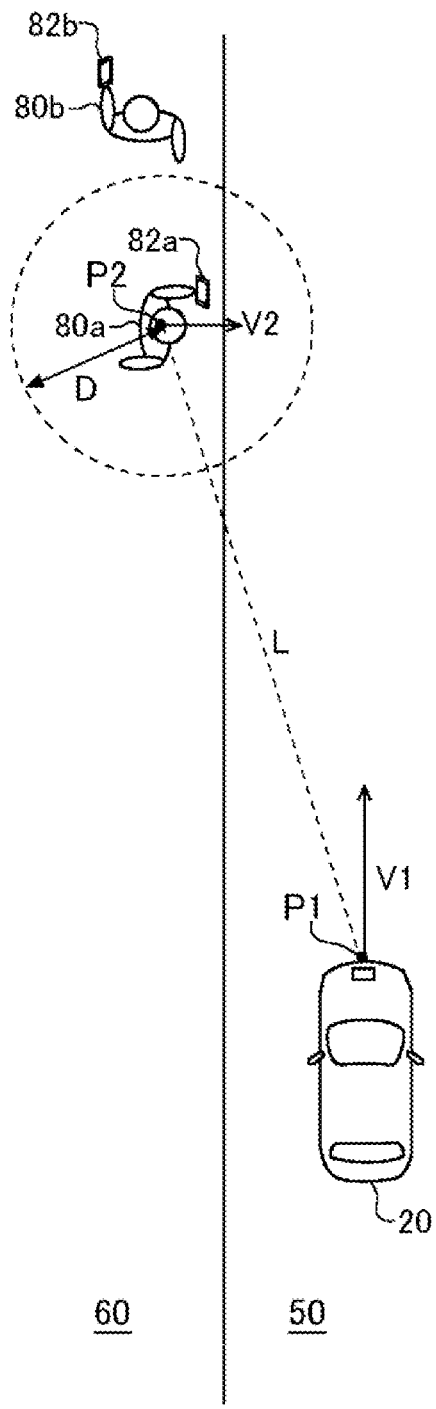
FIG. 4 schematically shows a situation where the image 300 has been acquired.

FIG. 3 schematically shows an image 300 captured by the camera 22. FIG. 4 schematically shows a situation where the image 300 has been acquired.

The image acquisition unit 220 acquires the image 300 from the camera 22. The extraction unit 222 analyzes the image 300 to extract objects of the pedestrians 80 at risk of approaching the vehicle 20. For example, the extraction unit 222 extracts, from the image 300, an object of a predetermined body such as a person or a vehicle which can be a "target" in this embodiment, to specify orientation of each body based on the extracted object. The extraction unit 222 may specify the orientation of each body based on a shape of the object of the body. The extraction unit 222 specifies, based on the specified orientation, an object of a body at risk of approaching the planned traveling route of the vehicle 20.

For example, in an example of FIG. 3, an object 310a and an object 310b are an object of a person. The body of the object 310a is facing toward the roadway 50. On the other hand, the body of the object 310b is not facing toward the roadway 50. Therefore, the extraction unit 222 extracts the object 310a as an object of the target at risk of approaching the vehicle 20.

The target distance acquisition unit 230 acquires distance measurement information from the radar 21. The target distance acquisition unit 230 calculates a distance L from a reference position P1 of the vehicle 20 to a position P2 of the pedestrian 80a, based on the distance measurement information acquired from the radar 21 and a position of the object 310a on the image 300. For example, the target distance acquisition unit 230 may cause the radar 21 to measure a distance to a body existing in a direction on a real space corresponding to the position of the object 310a. Moreover, the target distance acquisition unit 230 may specify the distance L, by acquiring, from the radar 21, distance measurement information on a plurality of points on a real space, and selecting, from the distance measurement information on the plurality of points, distance measurement information on a point corresponding to the position of the object 310a on the image 300. The target distance acquisition unit 230 may also specify the distance L by analyzing the image 300. The target distance acquisition unit 230 may specify the distance L based on a size of an object in the image 300. The target distance acquisition unit 230 may specify the distance L based on a blur amount and a color shift amount extracted from a region of the object 310a of the image, by taking advantage of the fact that a blur amount and a color shift amount vary depending on a distance to a subject. The target distance acquisition unit 230 may specify the distance L based on disparity information acquired by the camera 22. When the camera 22 is a twin-lens camera, the target distance acquisition unit 230 may also specify the distance L by extracting the disparity information from an image acquired from the twin-lens camera. Moreover, the target distance acquisition unit 230 may also specify the distance L by fusing data on the distance L specified with a plurality of different techniques or by weighting and adding up the data.

The target position calculation unit 240 acquires the positional information of the vehicle 20 detected by the GNSS reception unit 25. The target position calculation unit 240 calculates the position P2 of the pedestrian 80a in FIG. 4, based on the reference position P1 of the vehicle 20 based on the positional information detected by the GNSS reception unit 25, the distance L acquired by the target distance acquisition unit 230, and the position of the object 310a in the image 300. The communication control unit 270 generates warning information which includes positional information for indicating the position P2. In this embodiment, the positional information included in the warning information is coordinate information for indicating a geographic position of the position P2. The communication control unit 270 causes the communication unit 290 to transmit the warning information.

When receiving the warning information transmitted from the communication unit 290, the terminal 82a and the terminal 82b each extract the coordinate information of the position P2 from the warning information. The terminal 82a and the terminal 82b each determine whether respective terminals 82 is near the point P2. For example, the terminal 82a and the terminal 82b each determine whether a distance between a current position of respective terminals 82 and the point P2 is shorter than or equal to a predetermined distance D. Since the distance between the current position of the terminal 82a and the point P2 is shorter than or equal to D, the terminal 82a determines that the terminal 82a is near the point P2, to output a warning. On the other hand, since the distance between the current position of the terminal 82b and the point P2 exceeds D, the terminal 82b determines that the terminal 82b is not near the point P2, to discard the warning information without outputting a warning.

Note that the velocity calculation unit 260 may calculate a velocity V2 of the pedestrian 80a. For example, the velocity calculation unit 260 may calculate the velocity V2 of the pedestrian 80a based on a temporal change amount of the position calculated by the target position calculation unit 240. The communication control unit 270 may select, based on the velocity V2, a transmission method for the communication unit 290 to transmit the warning information. The communication control unit 270 may also select, based on a velocity V1 of the vehicle 20, a transmission method for the communication unit 290 to transmit the warning information. The communication control unit 270 may specify the velocity V1 at least based on the velocity of the vehicle 20 detected by the vehicle velocity sensor 26. The communication control unit 270 may specify the velocity V1 based on a temporal change amount of the position of the vehicle 20 detected by the GNSS reception unit 25. The communication control unit 270 may also calculate a relative velocity between the vehicle 20 and the pedestrian 80a based on the velocity V1 and the velocity V2, and select, based on the calculated relative velocity, a transmission method for the communication unit 290 to transmit the warning information. An example of a method for the communication control unit 270 to determine the transmission method based on the velocity will be described later.

Figure 5:
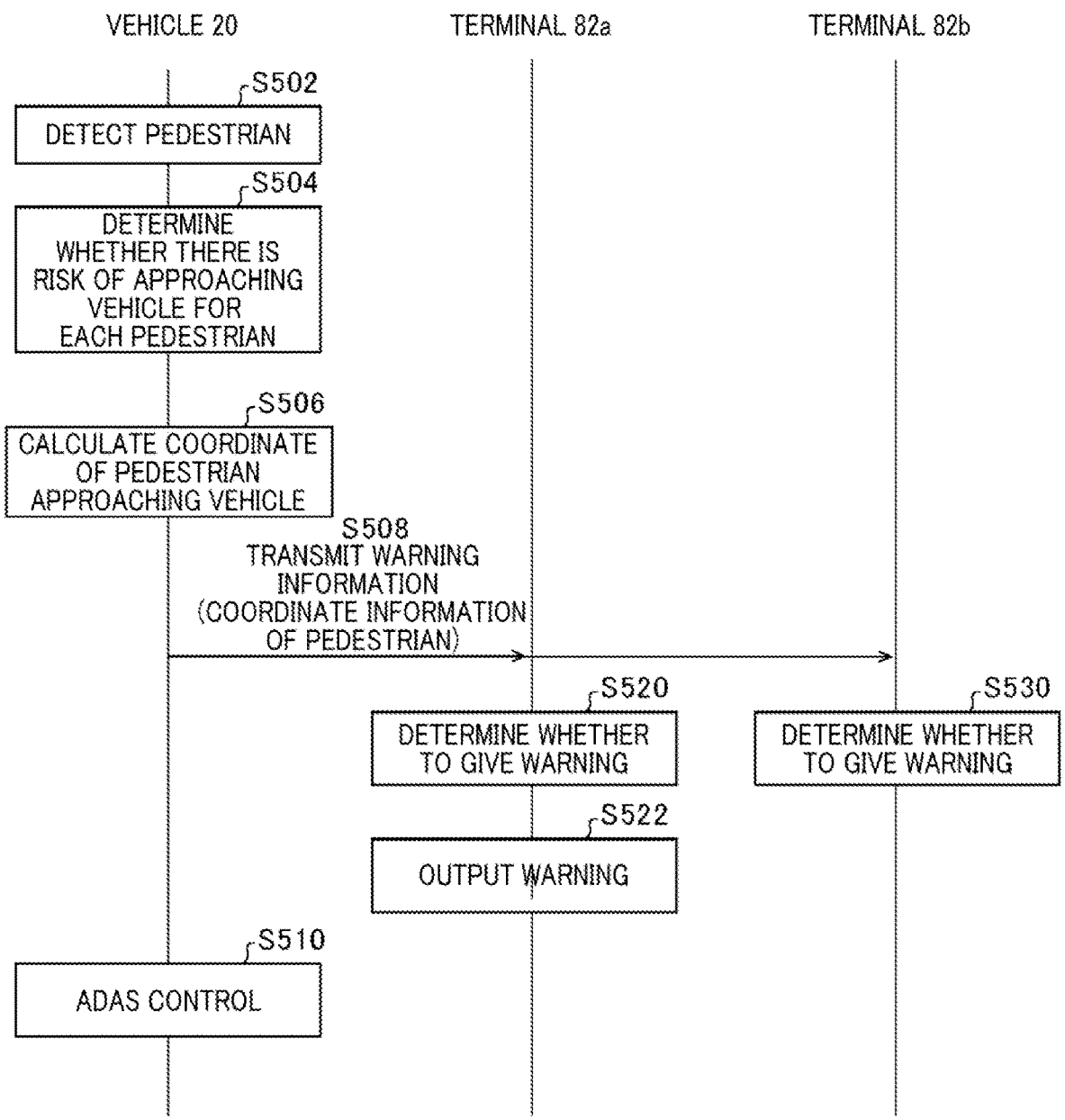
FIG. 5 schematically shows a flow of processing executed by the vehicle 20, a terminal 82a, and a terminal 82b.

FIG. 5 schematically shows a flow of processing executed by the vehicle 20, a terminal 82a, and a terminal 82b. FIG. 5 will describe a case where a pedestrian is recognized as a target at risk of approaching the vehicle 20.

At S502, the extraction unit 222 extracts an object of a pedestrian from the image acquired from the camera 22. At S504, the extraction unit 222 determines whether there is a risk of approaching the vehicle 20 for each pedestrian corresponding to each extracted object. At S506, the target position calculation unit 240 calculates a coordinate of a pedestrian at risk of approaching the vehicle 20.

At S508, the communication unit 290 transmits warning information including the coordinate information of the position of the pedestrian calculated at S506. At this time, the communication unit 290 may transmit the warning information by broadcasting, without designating the terminals 82 to be destinations of the warning information. The communication unit 290 may also designate the terminals 82 to be destinations of the warning information, to transmit the warning information by unicasting. The communication unit 290 may specify addresses of the surrounding terminals 82 acquired before transmitting the warning information, to transmit the warning information to the terminals 82 by unicasting. As an example, after specifying the coordinate of the pedestrian at S506, the communication unit 290 may acquire the addresses of the terminals 82 existing around the vehicle 20 by direct communication before transmitting the warning information to the terminals 82, to transmit the warning information to the terminals 82 by unicasting with the acquired addresses as destinations. The communication unit 290 may acquire the addresses of the terminals 82 based on beacon information transmitted from the terminals 82 existing around the vehicle 20, to transmit the warning information to the terminals 82 by unicasting with the acquired addresses as destinations.

When receiving the warning information from the communication apparatus 24, the terminal 82a determines at S520 whether to give a warning. For example, in an example shown in FIG. 4, the terminal 82a determines that the distance between the current position of the terminal 82a and the coordinate of the point P2 included in the warning information is shorter than or equal to the predetermined distance D. Therefore, the terminal 82a uses the HMI function of the terminal 82a to give a warning to the pedestrian 80a at S522. On the other hand, the terminal 82b determines at S530 that the distance between the current position of terminal 82b and the point P2 included in the warning information exceeds the predetermined distance D. In this way, the terminal 82b discards the warning information without giving a warning.

Note that the driver-assistance control apparatus 30 assists driving of the vehicle 20 at S510 after the warning information is transmitted at S508. For example, when a predetermined condition is met, the driver-assistance control apparatus 30 may notify the pedestrian of approach of the vehicle 20 by decelerating the vehicle 20 or performing beam passing or horn announcement, with a function of an Advanced Emergency Braking System.

FIG. 6 shows a data structure of transmission method information referred to by a communication control unit 270 to specify a transmission method. The transmission method information associates a category, a velocity, and a transmission method. The communication control unit 270 determines a transmission method of warning information with reference to the transmission method information. The transmission method information is stored in the storage unit 280.

A "category" is information for identifying a category of a body which can be a target of a warning such as a "pedestrian" or an "automobile" for example. A "velocity" is information for indicating a range of a velocity of a body which can be a target of a warning.

A "transmission method" is information for identifying a transmission method of warning information. The "transmission method" may include information for determining transmission signal intensity of the warning information. For example, a "method 2" may be a transmission method in which transmission is performed with higher signal intensity than a "method 1".

The "transmission method" may include information for determining whether to transmit warning information by unicast transmission or broadcast transmission. For example, the "method 1" may be "unicasting" and the "method 2" may be "broadcasting".

The "transmission method" may include information for determining the number of repeated transmissions of warning information in case of broadcast transmission. For example, the "method 2" may be a transmission method in which transmission is performed with a larger number of repeated transmissions than the "method 1".

The "transmission method" may include information for determining a period of repeated transmissions of warning information in case of broadcast transmission. For example, the "method 2" may be a transmission method in which transmission is performed with a longer period of repeated transmissions than the "method 1".

The "transmission method" may include information for determining a frequency of repeated transmissions of warning information in case of broadcast transmission. For example, the "method 2" may be a transmission method in which transmission is performed with a higher frequency of repeated transmissions than the "method 1". The "transmission method" may include information for determining a time interval of repeated transmissions of warning information in case of broadcast transmission. For example, the "method 2" may be a transmission method in which transmission is performed at a shorter interval of repeated transmissions than the "method 1".

The "transmission method" may include information for indicating whether to perform retransmission control of warning information in unicast transmission. For example, the "method 1" may be a transmission method in which no retransmission control is performed, and the "method 2" may be a transmission method in which retransmission control is performed.

The "transmission method" may include information for indicating the number of retransmission attempts for attempting retransmission of warning information in unicast transmission. For example, the "method 2" may be a transmission method in which transmission is performed with a larger number of retransmission attempts than the "method 1".

The "transmission method" may include information for identifying whether to transmit warning information by PC5. The "transmission method" may include information for identifying whether to transmit warning information by DSRC (registered trademark). The "transmission method" may include information for identifying whether to transmit warning information by Bluetooth (registered trademark). For example, the "method 1" may indicate that warning information is transmitted by DSRC (registered trademark), and the "method 2" may indicate that warning information is transmitted by PC5.

The communication control unit 270 selects, in the transmission method information, a transmission method associated with a combination of a category specified by the target specification unit 210 and a moving velocity calculated by the velocity calculation unit 260, to perform transmission by the selected transmission method. As an example, described will be a case where the "method 1" is a "unicasting" transmission method and the "method 2" is a "broadcasting" transmission method. When the velocity is higher than a predetermined velocity, the communication control unit 270 selects at least a "broadcasting" transmission method with reference to the transmission method information. Specifically, if a category of a warning target is a pedestrian, when a velocity of the pedestrian is 2 km/s or less, the communication control unit 270 selects "unicasting", and when the velocity of the pedestrian exceeds 2 km/s, the communication control unit 270 selects "broadcasting". If a category of a warning target is an automobile, when a velocity of the automobile is 5 km/s or less, the communication control unit 270 selects "unicasting", and when the vehicle velocity exceeds 5 km/s, the communication control unit 270 selects "broadcasting". Note that the "transmission method" may determine a combination of a plurality of transmission methods. For example, the "transmission method" may determine that the warning information is transmitted by "unicasting" and "broadcasting", in association with a case where the velocity of the automobile exceeds 5 km/s.

Thus, the communication control unit 270 selects the transmission method of the warning information based on a category of the target extracted by the extraction unit 222. This allows the communication control unit 270 to select the transmission method of the warning information depending on the category of the target, a degree of risk based on the moving velocity of the target. Note that the above-described selection of the transmission method is merely an example. For the selection of the transmission method, an optimal transmission method only has to be selected, in total consideration of a category of a target, risk of the target approaching the vehicle 20, time taken for the target to approach the vehicle 20, communication reliability, a degree of communication congestion, or the like. For example, there may be a case where the "method 1" is "broadcasting" and the "method 2" is "unicasting".

Note that the communication unit 290 may transmit warning information which includes category information for indicating the category of the target extracted by the extraction unit 222. When receiving the warning information, the terminals 82 may extract the category information included in the warning information, and determine not to give a warning if the extracted category information does not match a category information predetermined for the terminals 82. For example, when the vehicle 20 has transmitted warning information including category information of a "pedestrian", another vehicle having received said warning information may determine not to give a warning, since said another vehicle does not match a category indicated by the category information included in the warning information.

Figure 7:
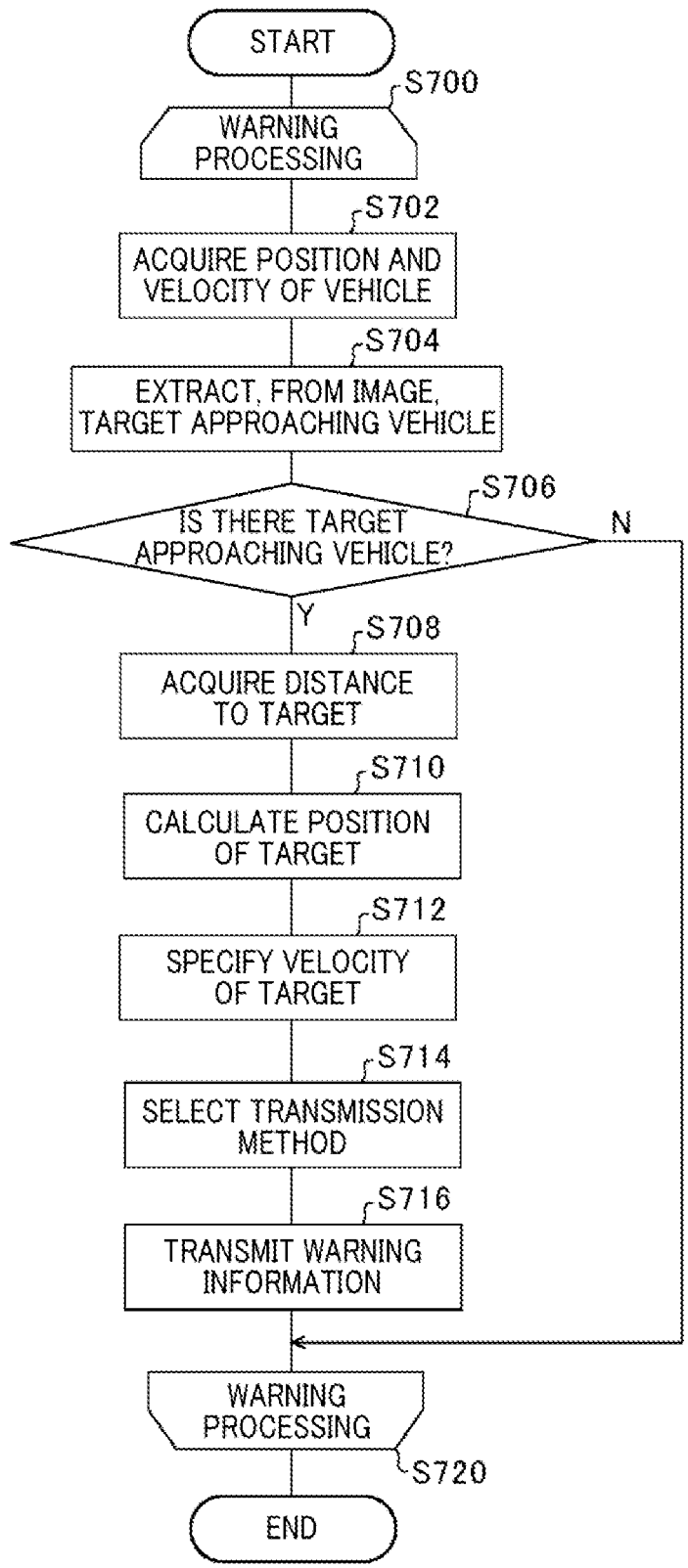
FIG. 7 shows a flow chart according to a communication method executed by a communication apparatus 24.

FIG. 7 shows a flow chart according to a communication method executed by a communication apparatus 24. The communication apparatus 24 repeatedly executes processing from a starting point S700 of a warning processing loop to an ending point S720 of the warning processing loop. When a predetermined condition is met at least one of the starting point S700 of the warning processing and the ending point S720 of the warning processing, the communication apparatus 24 ends the warning processing loop.

At S702, the moving body positional information acquisition unit 250 and the velocity calculation unit 260 respectively acquire a current position and a moving velocity of the vehicle 20. For example, the moving body positional information acquisition unit 250 acquires positional information successively outputted from the GNSS reception unit 25. Moreover, the velocity calculation unit 260 acquires velocity information successively outputted from the vehicle velocity sensor 26.

At S704, the extraction unit 222 extracts, from an image acquired by the image acquisition unit 220 from the camera 22, a target at risk of approaching the vehicle 20. Moreover, the extraction unit 222 specifies, from the image, a category of the target at risk of approaching the vehicle 20.

At S706, the target distance acquisition unit 230 determines whether the target at risk of approaching the vehicle 20 has been extracted. When no target at risk of approaching the vehicle 20 has been extracted, S720 follows. On the other hand, when a target at risk of approaching the vehicle 20 has been extracted, the target distance acquisition unit 230 acquires at S708 a distance to the target extracted at S704. The target distance acquisition unit 230 acquires, based on the distance measurement information from the radar 21 or an analysis result of the image acquired by the image acquisition unit 220, the distance to the target extracted at S704.

At S710, the target position calculation unit 240 calculates a position of the target extracted at S704. Specifically, the target position calculation unit 240 calculates, based on the position of the vehicle acquired at S702, the distance to the target acquired at S708, and the position of the target in the image, a geographic coordinate indicating the position of the target extracted at S704.

At S712, the velocity calculation unit 260 calculates a moving velocity of the target extracted at S704. For example, the velocity calculation unit 260 may calculate, based on a temporal change amount of the position of the target extracted at S704, the velocity of the target extracted at S704. The velocity calculation unit 260 may also calculate a relative moving velocity between the target and the vehicle 20.

At S714, the communication control unit 270 selects a transmission method of warning information based on the moving velocity calculated at S712 and the category of the target extracted at S704.

At S716, the communication unit 290 transmits, according to the transmission method selected at S714, warning information including the coordinate of the target calculated at S710.

According to the warning system 10 described above, since the communication apparatus 24 transmits the warning information including the positional information, it is possible to prevent a warning from being given to the pedestrians 80 who do not need a warning. Moreover, it is possible to suppress occurrence of unnecessary communication between the terminals 82 and the vehicle 20. Moreover, each terminal 82 only has to calculate a distance between the positional information included in the warning information and the current position of respective terminals 82, and each terminal 82 does not need to perform processing such as checking a position of the vehicle 20 approaching the pedestrians 80. Therefore, a load on the terminals 82 can be reduced.

Note that the vehicle 20 is an example of transportation equipment. The transportation equipment includes, for example, an automobile such as a passenger vehicle or a bus, a saddle-ride type vehicle, and a bicycle. Moreover, the moving body includes not only a person but also transportation equipment, for example, an automobile such as a passenger vehicle or a bus, a saddle-ride type vehicle, and a bicycle.

Figure 8:
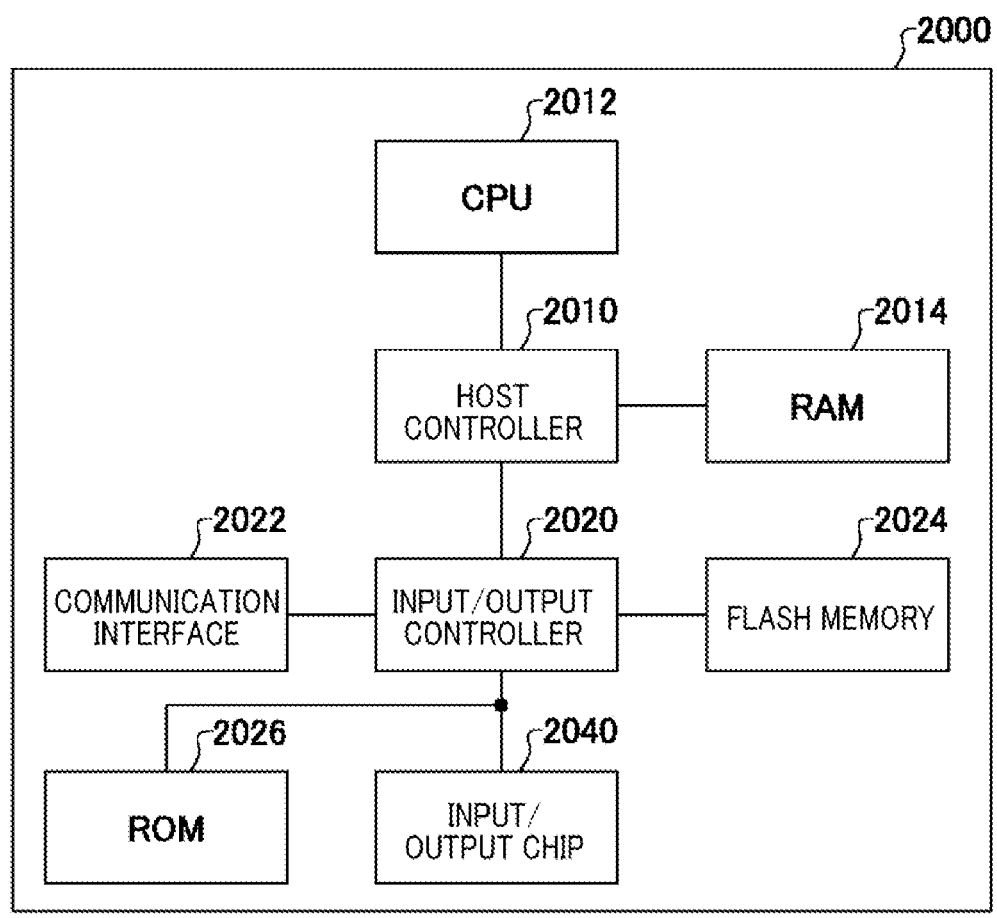
FIG. 8 shows an example of a computer 2000.

FIG. 8 shows an example of a computer 2000 where a plurality of embodiments of the present invention may be entirely or partially embodied. Programs installed in the computer 2000 can cause the computer 2000 to: function as apparatuses such as the communication apparatus 24 according to the embodiments, or each unit of said apparatuses; execute operations associated with said apparatuses or each unit of said apparatuses; and/or execute a process according to the embodiments or steps of said process. Such programs may be executed by a CPU 2012 in order to cause the computer 2000 to execute a specific operation associated with some or all of the processing procedures and the blocks in the block diagram described herein.

The computer 2000 according to this embodiment includes the CPU 2012 and RAM 2014, which are mutually connected by a host controller 2010. The computer 2000 also includes ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, an HDMI (registered trademark) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardwares resources described above. An apparatus or a method may be configured by realizing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Then, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described herein and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute are stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the communication apparatus 24 may instruct the CPU 2012 or the like to cause the computer 2000 to function as each unit of the communication apparatus 24. The information processing written in these programs are read by the computer 2000 to cause the computer to function as each unit of the communication apparatus 24, which is a specific means realized by the cooperation of software and the various types of hardware resources mentioned above. Then, these specific means realize operations or processing of information corresponding to the intended use of the computer 2000 in this embodiment, so that the communication apparatus 24 is constructed as a specific communication apparatus corresponding to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide a means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or drawings can be performed in any order as long as the order is not clearly indicated by "prior to," "before," or the like and as long as the output from a previous process is not used in a later process. Even if the process flow is described using phrases such as "first" or "next" in the claims, embodiments, or drawings, it does not necessarily mean that the process must be performed in this order.

LIST OF REFERENCE NUMERALS

10: warning system
20: vehicle
21: radar
22: camera
24: communication apparatus
25: GNSS reception unit
26: vehicle velocity sensor
29: sensor
30: driver-assistance control apparatus
50: roadway
60: footpath
80: pedestrian
82: terminal
100: vehicle
200: processing unit
210: target specification unit
220: image acquisition unit
222: extraction unit
230: target distance acquisition unit
240: target position calculation unit
250: moving body positional information acquisition unit
260: velocity calculation unit
270: communication control unit
280: storage unit
290: communication unit
300: image
310: object
2000: computer
2010: host controller
2012: CPU
2014: RAM
2020: input/output controller
2022: communication interface
2024: flash memory
2026: ROM
2040: input/output chip

What is claimed is:

1. A communication apparatus comprising:
at least one processor;
a target specification unit that uses the at least one processor for specifying a position of a target at risk of approaching a moving body; and
a communication unit that uses the at least one processor for transmitting, based on the position of the target specified by the target specification unit, warning information including positional information of an external terminal to output a warning;
wherein the target specification unit has:
a moving body positional information acquisition unit that uses the at least one processor for acquiring positional information of the moving body;
an image acquisition unit that uses the at least one processor for acquiring an external image of the moving body;
an extraction unit that uses the at least one processor for extracting, from the image acquired by the image acquisition unit, the target at risk of approaching the moving body;
a target distance acquisition unit that uses the at least one processor for acquiring a distance to the target extracted by the extraction unit, configured to acquire the distance to the target by a radar installed in the moving body; and
a target position calculation unit that uses the at least one processor for calculating, based on the positional information of the moving body and the distance to the target, the position of the target at risk of approaching the moving body.

2. The communication apparatus according to claim 1, wherein
the communication unit is configured to cause, by transmitting the warning information, the external terminal which has received the warning information to output a warning, when the external terminal is located within a range determined from the positional information included in the warning information.

3. The communication apparatus according to claim 1, wherein
the communication unit is configured to cause, by transmitting the warning information, the external terminal which has received the warning information to output a warning, when the external terminal is located within a range determined from the positional information included in the warning information.

4. The communication apparatus according to claim 1, wherein
the communication unit is configured to transmit the warning information to the external terminal by direct communication.

5. The communication apparatus according to claim 1, wherein
the communication unit is configured to transmit the warning information to the external terminal by direct communication.

6. The communication apparatus according to claim 2, wherein
the communication unit is configured to transmit the warning information to the external terminal by direct communication.

7. The communication apparatus according to claim 1, wherein
the communication unit is configured to transmit the warning information by broadcasting.

8. The communication apparatus according to claim 1, wherein
the communication unit is configured to transmit the warning information by broadcasting.

9. The communication apparatus according to claim 1, wherein
the target distance acquisition unit is configured to acquire the distance to the target based on the image acquired by the image acquisition unit.

10. The communication apparatus according to claim 1, further comprising
a communication control unit that uses the at least one processor for selecting a transmission method for the communication unit to transmit the warning information, wherein
the communication control unit is configured to select the transmission method based on at least any of a moving velocity of the target, a moving velocity of the moving body, and a relative velocity between the moving body and the target.

11. The communication apparatus according to claim 1, further comprising
a communication control unit that uses the at least one processor for selecting a transmission method for the communication unit to transmit the warning information, wherein
the communication control unit is configured to select the transmission method based on a category of the target.

12. The communication apparatus according to claim 10, wherein
the transmission method includes a first transmission method in which the warning information is transmitted with a first signal intensity and a second transmission method in which the warning information is transmitted with a second signal intensity different from the first signal intensity, and
the selection of the transmission method includes selecting one of the first transmission method and the second transmission method.

13. The communication apparatus according to claim 10, wherein
the transmission method includes a first transmission method in which the warning information is transmitted by unicasting to an external terminal associated with the target, and a second transmission method in which the warning information is transmitted by broadcasting, and
the selection of the transmission method includes selecting one of the first transmission method and the second transmission method.

14. The communication apparatus according to claim 1, wherein
the target includes at least one of a person and a vehicle.

15. The communication apparatus according to claim 1, wherein
the moving body is a vehicle.

16. The communication apparatus according to claim 1, wherein the target is a pedestrian and the moving object is a vehicle.

17. The communication apparatus according to claim 1, wherein the target is a pedestrian, the external terminal is a mobile phone, and the moving object is a vehicle.

18. A vehicle comprising the communication apparatus according to claim 15.

19. A non-transitory computer-readable storage medium having recorded thereon a program that causes a computer to function as:
a target specification unit for specifying a position of a target at risk of approaching a moving body; and
a communication unit for transmitting, based on the position of the target specified by the target specification unit, warning information including positional information of an external terminal to output a warning;
wherein the target specification unit has:
a moving body positional information acquisition unit for acquiring positional information of the moving body;
an image acquisition unit for acquiring an external image of the moving body;
an extraction unit for extracting, from the image acquired by the image acquisition unit, the target at risk of approaching the moving body;
a target distance acquisition unit for acquiring a distance to the target extracted by the extraction unit, configured to acquire the distance to the target by a radar installed in the moving body; and
a target position calculation unit for calculating, based on the positional information of the moving body and the distance to the target, the position of the target at risk of approaching the moving body.

20. A communication method comprising:
specifying a position of a target at risk of approaching a moving body; and
transmitting, based on the specified position of the target, warning information including positional information of an external terminal to output a warning;
wherein the specifying includes:
acquiring positional information of the moving body;
acquiring an external image of the moving body;
extracting from the image the target at risk of approaching the moving body;
acquiring a distance to the target at risk using radar installed in the moving body; and
calculating, based on the positional information of the moving body and the distance to the target, the position of the target at risk of approaching the moving body.

21. A communication apparatus comprising:
a target specification unit for specifying a position of a target at risk of approaching a moving body; and
a communication unit for transmitting, based on the position of the target specified by the target specification unit, warning information including positional information of an external terminal to output a warning, wherein
the communication unit transmits warning information which includes category information for indicating a category of the target, and
when receiving the warning information, the external terminal extracts the category information included in the warning information, and does not give a warning if the extracted category information does not match category information predetermined for the external terminal.

22. A non-transitory computer-readable storage medium having recorded thereon a program that causes a computer to function as:
a target specification unit for specifying a position of a target at risk of approaching a moving body; and
a communication unit for transmitting, based on the position of the target specified by the target specification unit, warning information including positional information of an external terminal to output a warning, wherein
the communication unit transmits warning information which includes category information for indicating a category of the target, and
when receiving the warning information, the external terminal extracts the category information included in the warning information, and does not give a warning if the extracted category information does not match category information predetermined for the external terminal.

23. A communication method comprising:
- specifying a position of a target at risk of approaching a moving body; and
- transmitting, based on the specified position of the target, warning information including positional information of an external terminal to output a warning;

wherein the warning information includes category information for indicating a category of the target, and when receiving the warning information, the category information included in the warning information is extracted, and a warning is not given if the extracted category information does not match predetermined category information.

* * * * *